United States Patent
Balakrishnan et al.

(10) Patent No.: US 8,649,552 B2
(45) Date of Patent: *Feb. 11, 2014

(54) DATA OBFUSCATION OF TEXT DATA USING ENTITY DETECTION AND REPLACEMENT

(75) Inventors: Sreeram Viswanath Balakrishnan, New Delhi (IN); Rema Ananthanarayanan, New Delhi (IN); Souptik Datta, Pin (IN)

(73) Assignee: International Business Machines Corporation, Armonk, NY (US)

( * ) Notice: Subject to any disclaimer, the term of this patent is extended or adjusted under 35 U.S.C. 154(b) by 663 days.

This patent is subject to a terminal disclaimer.

(21) Appl. No.: 12/061,783

(22) Filed: Apr. 3, 2008

(65) Prior Publication Data
US 2008/0181396 A1 Jul. 31, 2008

Related U.S. Application Data

(63) Continuation of application No. 11/562,559, filed on Nov. 22, 2006, now Pat. No. 7,724,918.

(51) Int. Cl.
*G06K 9/00* (2006.01)

(52) U.S. Cl.
USPC ........... 382/100; 382/112; 382/173; 382/176; 726/26; 380/252; 380/243; 380/246; 380/55; 713/189

(58) Field of Classification Search
None
See application file for complete search history.

(56) References Cited

U.S. PATENT DOCUMENTS

| | | | |
|---|---|---|---|
| 6,061,449 A | 5/2000 | Candelore et al. | |
| 6,654,754 B1 | 11/2003 | Knauft et al. | |
| 6,918,039 B1 | 7/2005 | Hind et al. | |
| 6,937,730 B1 | 8/2005 | Buxton | |
| 6,957,341 B2 | 10/2005 | Rice et al. | |
| 7,184,947 B2* | 2/2007 | Matsuoka et al. | 704/8 |
| 7,831,571 B2* | 11/2010 | Roy et al. | 707/694 |
| 7,861,096 B2* | 12/2010 | Staddon et al. | 713/193 |
| 2002/0077999 A1* | 6/2002 | Fergus | 707/1 |
| 2002/0091741 A1* | 7/2002 | Ferreira et al. | 707/530 |
| 2002/0091975 A1 | 7/2002 | Redlich et al. | |
| 2002/0176572 A1 | 11/2002 | Ananth | |
| 2003/0051054 A1* | 3/2003 | Redlich et al. | 709/246 |
| 2003/0120949 A1* | 6/2003 | Redlich et al. | 713/200 |
| 2004/0133793 A1* | 7/2004 | Ginter et al. | 713/193 |
| 2005/0060643 A1 | 3/2005 | Glass et al. | |
| 2005/0138110 A1* | 6/2005 | Redlich et al. | 709/201 |

(Continued)

OTHER PUBLICATIONS

Sentry's Perl script (forums.fedoraforum.org, posted May 2006).*

(Continued)

*Primary Examiner* — Matthew Bella
*Assistant Examiner* — Jason Heidemann
(74) *Attorney, Agent, or Firm* — Gibb & Riley, LLC

(57) ABSTRACT

A data obfuscation method, apparatus and computer program product are disclosed in which at least selected text entities such as words or abbreviations in a document are obfuscated to prevent the disclosure of private information if the document is disclosed. A user establishes various configuration parameters for selected text entities desired to obfuscated. The document is processed and text entities matching the configuration parameters are tagged for obfuscation. The tagged entities are then substituted in the document with obfuscating text. The obfuscating text can be derived from a hash table. The hash table may be used to provide a reverse obfuscation method by which original data can be restored to an obfuscated document.

11 Claims, 4 Drawing Sheets

(56) References Cited

U.S. PATENT DOCUMENTS

| | | | |
|---|---|---|---|
| 2005/0251865 A1 | 11/2005 | Mont et al. | |
| 2005/0289358 A1* | 12/2005 | Haselden et al. | 713/187 |
| 2006/0015486 A1* | 1/2006 | Nomiyama et al. | 707/3 |
| 2006/0075228 A1* | 4/2006 | Black et al. | 713/167 |
| 2006/0089857 A1* | 4/2006 | Zimmerman et al. | 705/2 |
| 2007/0038437 A1* | 2/2007 | Brun | 704/9 |
| 2007/0094594 A1* | 4/2007 | Matichuk et al. | 715/530 |
| 2007/0255704 A1* | 11/2007 | Baek et al. | 707/6 |
| 2007/0260448 A1 | 11/2007 | Lorenzen et al. | |
| 2008/0046757 A1* | 2/2008 | Staddon et al. | 713/189 |
| 2008/0275311 A1* | 11/2008 | Haq | 600/300 |

OTHER PUBLICATIONS

Sweeney "Computational disclosure control: a primer on data privacy protection". PhD Thesis. Spring: Massachusetts Institute of Technology, 2001.*

Bakhtiari et al."Cryptographic Hash Functions: A Survey" (1995).*

Still, "Data Obfuscation and Encryption", 2000.*

Balakrishnan et al., U.S. Appl. No. 11/562,559, Notice of Allowance, Dec. 31, 2009, 6 pages.

Hess, A and Seamons, KE; "*An Access Control Model for Dynamic Client-Side Content*"; SACMAT '03 Conference; Jun. 2-3, 2003; Como, Italy.

Hess, Adam; et al; "*Content Triggered Trust Negotiation*"; ACM Transactions on Information and Systems Security; vol. 7, No. 3; Aug. 2004; pp. 428-456.

Agrawal, R and Srikant, R; "*Privacy-Preserving Data Mining*"; In Proceedings of the ACM SIGMOD Conference on Management of Data; pp. 439-450; May 2000; ACM Press.

Sweeney, L and k-Anonymity; "*A model for preserving privacy*"; International Journal on Uncertainty, Fuzziness and Knowledge-Based Systems; 10(5); 2002; 557-570.

Sweeney, L; "*Replacing Personally Identifiable Information in Medical Records, the Scrub System*"; Proceedings; Journal of the American Medical Informatics Association; 1996.

Ruch, Patrick; Baud, Robert H; Rassinoux, Anne-Marie; Bouillon, Pierrette; and Robert, Gilbert; "*Medical Document Anonymization with a Semantic Lexicon*"; Medical Informatics Division, University Hospital of Geneva; ISSCO, University of Geneva.

Tang, Min; Hakkani-Tur, Dilek; and Tur, Gokhan; "*Preserving Privacy in Spoken Language Databases*".

* cited by examiner

DATA OBFUSCATION OF TEXT DATA USING ENTITY DETECTION AND REPLACEMENT

CROSS-REFERENCE TO RELATED APPLICATIONS

This application is a continuation of U.S. application Ser. No. 11/562,559 filed Nov. 22, 2006, and issued on May 25, 2010 as U.S. Pat. No. 7,724,918, the complete disclosure of which, in its entirety, is herein incorporated by reference.

FIELD OF INVENTION

The present invention relates to the dissemination of data where data sensitivity is involved and, more particularly with data obfuscation of unstructured text data.

BACKGROUND

Applications in machine learning, information retrieval, text processing, data mining and Natural Language Processing (NLP) research typically require large amounts of data for proper testing and validation of the correctness of the technical routines that implement the applications. Data that is most desired for testing and validating the efficiency and correctness of the techniques and routines in a business domain is typically real-life data that includes confidential information. Examples of such confidential information are customer transaction information, customer preferences, customer feedback and survey feedback. Other domains where data sharing is useful for providing better services to the customer, but restricted because of privacy considerations, include the health domain. While some text corpora are available in the public domain in specific areas (for example, the Enron database comprising emails of Enron employees), in general, a lack of availability of real-life data and the conflict between the needs of data-privacy and data-sharing are impediments for research and development of applications in these fields. These problems also prevent the full use of applications that require sharing of information, such as occurs in the health domain. Also, many enterprises today outsource some parts of their business applications to third parties, for efficiency and cost reasons. The data that also needs to be shared may sometimes contain personal or sensitive information and it may not be legally permissible to share the data as such with the third parties. In these cases, it is useful to have techniques that clean the data of sensitive information, before it is made public or otherwise disseminated.

Data sanitization or data obfuscation techniques refer to techniques that remove or replace the sensitive text or information in confidential documents, in a manner that does not expose the identifiable information or the confidential information. When these desensitized or obfuscated documents are shared, the end users are then not able to gather any personal information related to individual data entities. In some cases these techniques have also been extended to clean data in such a manner that even aggregate information cannot be gleaned from the sanitized data. These techniques are also referred to as data anonymization, data cleaning or desensitization. The techniques are designed such that no confidential information is disclosed to the end user, but enough information is retained for other analytical and processing applications that the end-user may wish to perform on the data.

However, current obfuscation techniques are widely available only for numerical data and for text data in structured format (typically in relational tables). In the few cases where the obfuscation is done on unstructured text, this has been restricted to simply removing the sensitive information from the original text and replacing it by blanks or some dummy tags. This can lead to a loss of the form of the original document.

These current obfuscation techniques broadly fit into 2 categories, based on the type of data addressed—numerical data and text data. The standard techniques used in both categories include data randomization, data swapping and data anonymization, where the sensitive data is replaced with a fixed value or an interval of values. The overall goal is to prevent the reconstruction of the initial data. For numerical data, the objectives have been to obscure information at the level of individual records, while preserving aggregate properties, for various data mining applications. Examples include preserving statistical properties such as the mean and the variance.

For text data, the work done may be classified broadly under the heads of structured data (or data available in relational databases) and unstructured data (such as plain text documents). Most of the existing work focuses on anonymization of structured data. The main application areas have been the health domain. Anonymization of medical information has been performed using techniques of generalization and suppression, where the anonymization is achieved to the extent that a particular record cannot be identified within k other records, for some predetermined number k. Other approaches use techniques from information retrieval for entity identification and subsequent replacement by some dummy text, and techniques for obfuscation of sensitive information in spoken language databases (text documents of speech recordings).

In the case of structured text in a relational format, in some instances the task of obfuscation is very straightforward, for example where a column containing sensitive information is completely hidden or deleted before the data is published. In the case of unstructured information, the task is more complex, since initially the information needs to be identified before it is replaced. Once the sensitive information is identified, some of the techniques used for replacement include:

Simple deletion: each occurrence of personal identifiable information is deleted; for example, 'Dear Jane'→'Dear . . . ';

Fixed transformation: each instance of the information to be hidden is replaced as in, 'Dear Jane'→'Dear <NULL>' or 'Dear <Person>';

Partial masking: some parts of the information are replaced, as for example, the date column in a date field comprising date, month and year, or the location code in a telephone number (eg: 410-788-5230→410-2-2×).

In the above techniques, there is some loss of data in the transformed text, at the cost of efficiency and preserving privacy. Further, when an end user accesses the document either intentionally or unintentionally, the user is aware of which parts of the text contained the sensitive information.

SUMMARY

Disclosed are methods and implementation for the obfuscation of sensitive information in text data that is in unstructured format. A preferred method attempts to preserve the readability of the original document, and to transform the sensitive information in the original document is such a manner that it is possible to reconstruct the original document from the obfuscated document.

In one aspect, a method of selectively obfuscating text data in a document is provided. Parameters to be used in said obfuscation are identified. Text data in the document for obfuscation is identified using the identified configuration parameters. The identified text data is transformed using obfuscating data associated with at least one of the configuration parameters. The transformed data from the respective said identified text data is substituted into said document.

In another aspect, a method of restoring an obfuscated document to an original form is disclosed. The obfuscated document is sequentially parsed to examine text entities in the document. It is determined whether a current text entity in the document is found in a hash table used in formation of said obfuscated document. A next text entity is selected and the determination is repeated where the current text entity is not found in the hash table. A text entity corresponding to the current text entity from the hash table is obtained. The obtained text entity is substituted into the document in place of the current text entity. These processes are repeated until the entire document has been parsed.

One implementation to obfuscate unstructured text documents includes a user specification of the entities of interest that need to be obfuscated in the documents. The implementation identifies the entities relating to personal identifiable information and other entity-related information such as company names, locations and event dates, as specified by the user. The identified entities in the original document are then suitably replaced by other instances of the entities of the same type, ensuring that the readability of the transformed document is preserved and it is possible to recreate the original document from the transformed document.

An advantage of preserving readability is that even when the documents are shared unintentionally, there is no way in which users can identify the obfuscated versus non-obfuscated information. Hence the documents may be shared more widely, wherein end-users need not be aware that they are looking at desensitized documents.

The present disclosure provides an implementation of a data obfuscator where the readability of the document is preserved in the transformed document after the data anonymization, and where it is possible to recreate the original document from the transformed document and knowledge of the transformation mappings. The benefits of preserving readability are (a) even if the data is unintentionally accessed, the user is not aware which information is original and which is replaced; and (b) text-processing and analytical applications designed for the initial data may be run on the transformed data with no changes.

DETAILED DESCRIPTION

Figure 1:
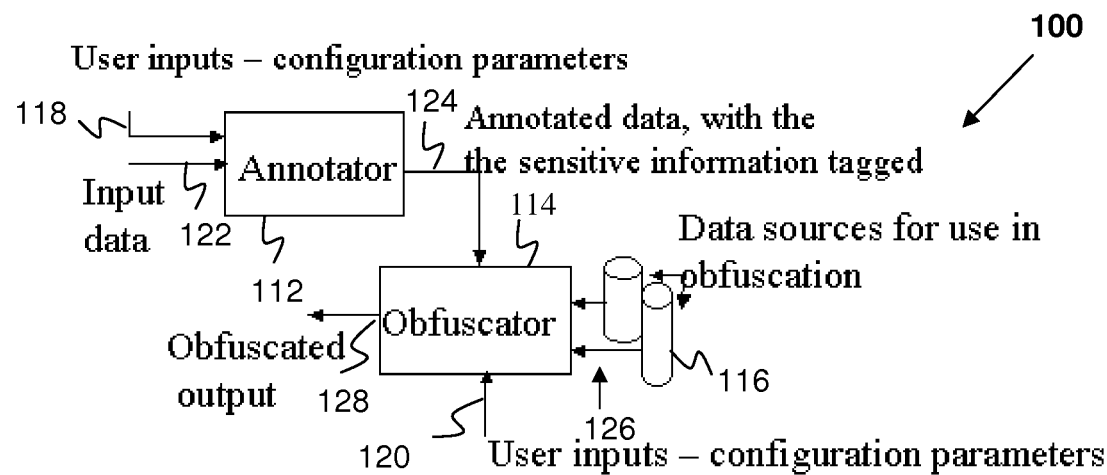
FIG. 1 is a high level architecture representation of data obfuscator system according to the present disclosure.

FIG. 1 shows a high level architecture for a data obfuscator system 100 incorporating an interconnection between a text annotator 112, a configurable obfuscator module 114 and data sources 116 for use in obfuscation. User inputs comprising configuration parameters 118 and 120 are provided as inputs to each of the annotator 112 and obfuscator module 114 respectively. Input data 122 is also provided to the annotator 112. The input data 122 is typically a text-based document intended for dissemination. Such a document will generally have text data that requires obfuscation and may also contain numerical data for which obfuscation is desired.

The text annotator 112 identifies the text entities of interest in the source document 122 and tags the words with the appropriate tags. The identification may use named-entity annotators which operate to recognise entities such as 'person name', email domain and company name. The recognition could be through dictionary lookups. Examples of entities could be 'person name', 'city', 'email domain', or 'company name'. Each of these entities may be further qualified by attributes such as 'gender' in the case of 'person name', or 'country' in the case of 'city'. One example of a form for such qualification may be 'person name-gender' or 'city-country'. The text annotator 112 outputs annotated data 124 in which sensitive information is tagged and non-sensitive information is not tagged.

The data sources 116 comprise at least a data source for each text entity type. Each data source contains a range or set of possible values for the particular entity type. Replacement or anonymization is done from this set of values, defining a suitable hash map. A hash map defines a mapping function for a set of entity values (or keys) such that each entity value maps to a specific value. An example of a hash map could be viewed as (A=astor, B=brown, C=cedar.) In this case, A, B and C are the keys and the values astor, brown and cedar are the hash values. When the entity A is to be anonymised, it is replaced by its hash value, in this case the string 'astor'. The keys and hash values may be numeric or text; the values for each key could be user-defined inputs in terms of actual values, or derived from some form of functional expression. Examples of data sources are a list of person names, list of cities, or list of Internet domain names. These could be further qualified as list of US male names, list of Chinese female names, list of commerce domains and so on, for a more semantically aligned replacement.

The entity values 126 received from the data sources 116 are provided to the configurable obfuscator module 114 together with the annotated data 124 and the configuration parameters 120. The configurable obfuscator module 114 performs a number of tasks.

Firstly, the obfuscator module 114 allows the user to define the level of obfuscation desired for each application. This may be done by specifying names of entities that contain the sensitive information, such as person names, company names and email identifiers. Further, the user may also specify, for each entity, the level of obfuscation required. For example months and years could remain unaltered whilst dates are altered, or vice versa. These specifications form configuration parameters 120 provided by the user. The configuration parameters 118 and 120 could be input via a GUI provided for that purpose. Alternately, they could also be additional command-line parameters to be specified when invoking the annotator and/or the obfuscator. The configuration parameters 118 for the annotator 112, specify inputs such as the entities to be annotated (examples include names of persons, names of companies, dates and names of places), the dictionaries to use, and other parameters required for the annotator 112. The configuration parameters 120 specify the configuration inputs required by the obfuscator 114, such as the hash map or hash function to be used, the level of obfuscation, and other such parameters. For instance, one input might be a name lookup table, which specifies how a name in the source document is to be replaced in the obfuscated document. Another input might be a function that specifies how dates are to be replaced.

The obfuscator module 114 defines the transformation function for each of the entities to be anonymized for both text and numerical data. For the text data, the obfuscator module 114 maps each of the tagged entities 124 to a specific entity value derived from the entity values 126 as appropriate for data source 116. For numerical data, the obfuscator module 114 defines a function to be used for the transformation of the input data. The user may specify which transformation to apply. For example, for numerical data, the initial data may be replaced by new data that is in a pre-specified range. Similarly, for calendar entries such as dates and months, the replacement may be chosen within a range of the original values.

The obfuscator module 114 also performs the transformation of the annotated input document 122 by replacing the tagged sensitive information 124 with the transformed data, selected from the data sources 116 or computed, in the case of numerical functions.

Figure 2:
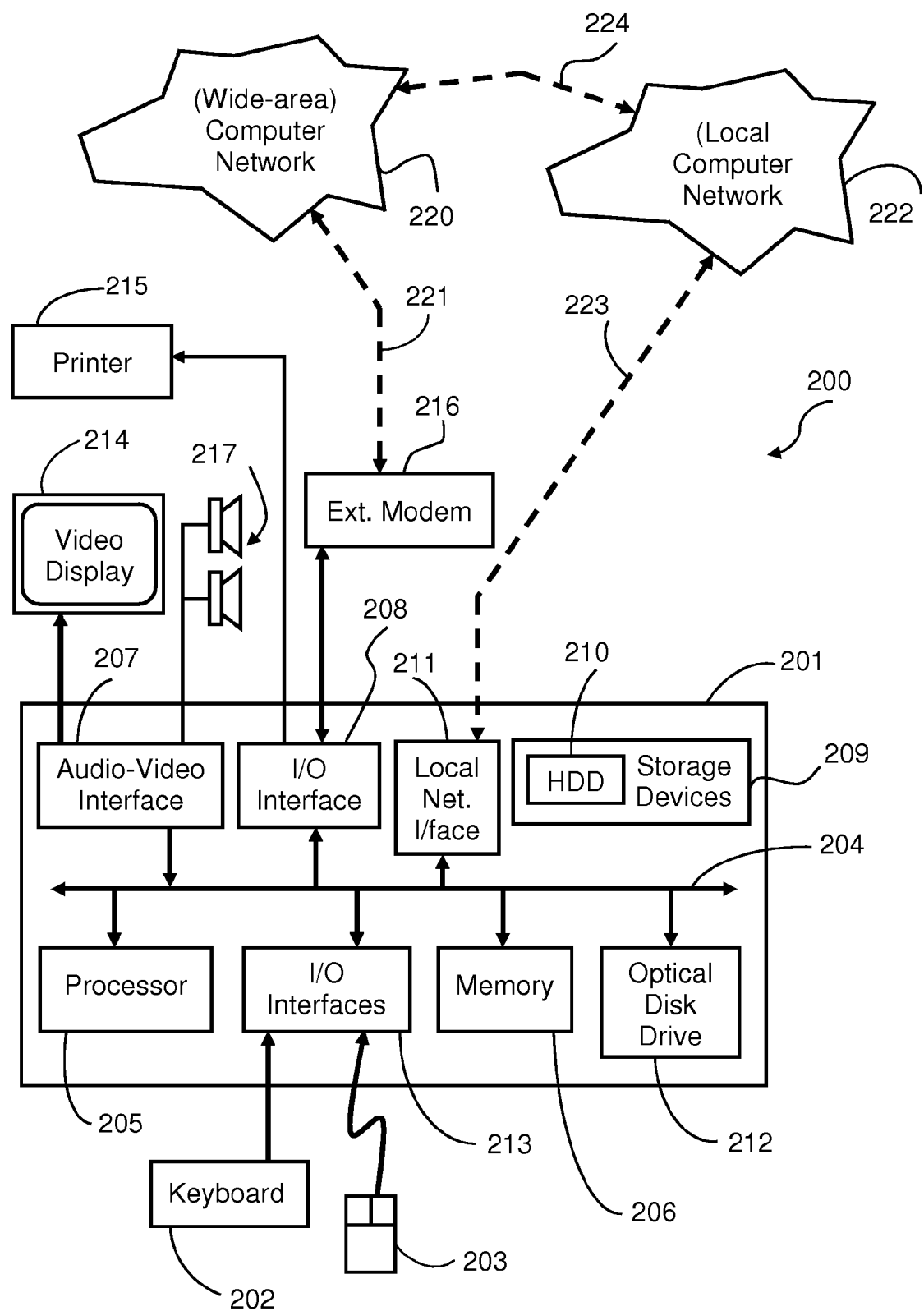
FIG. 2 is a schematic block diagram representation of a computer system in which the system of FIG. 1 may be implemented.
Figure 3:
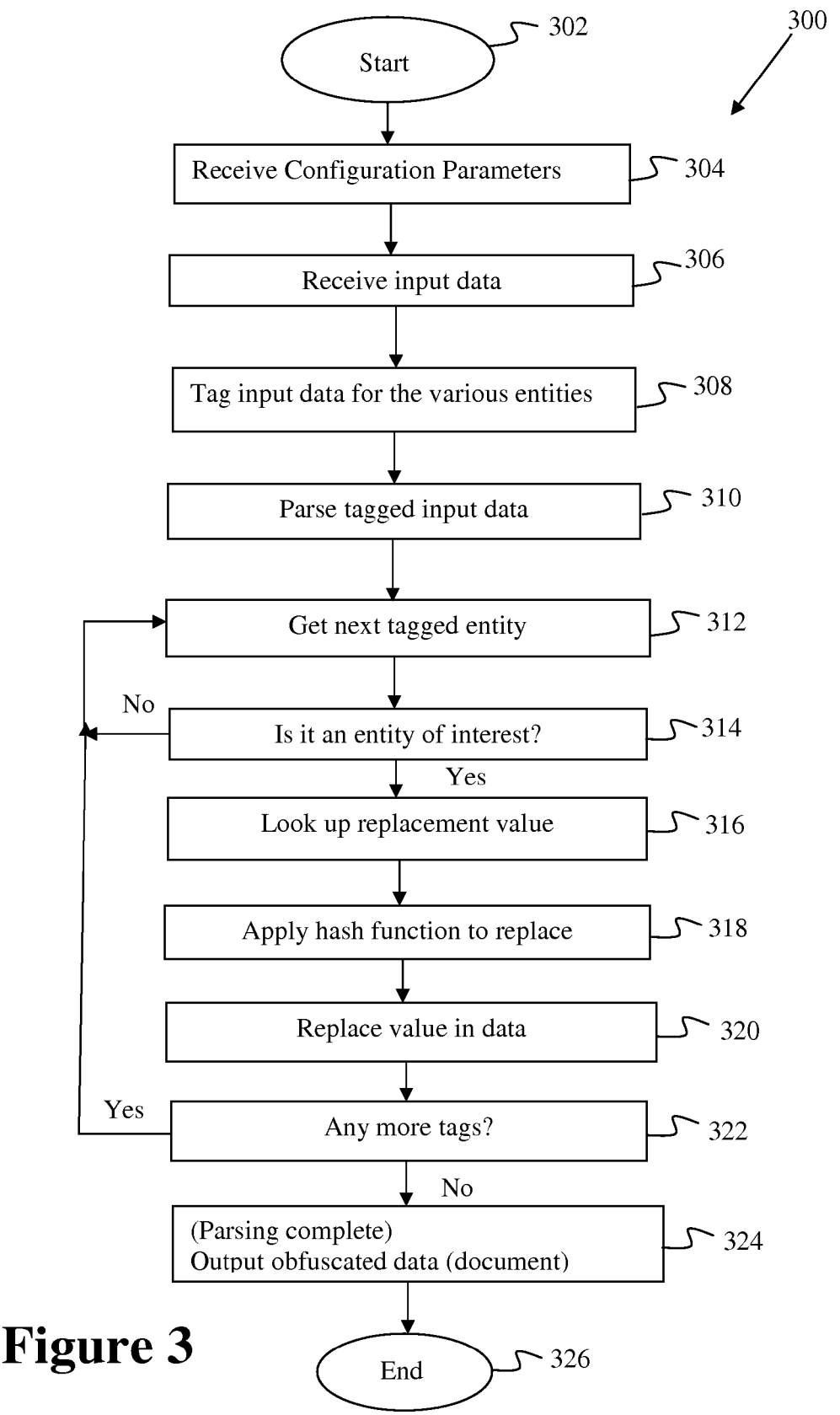
FIG. 3 is a flowchart of a method of data obfuscation.
Figure 4:
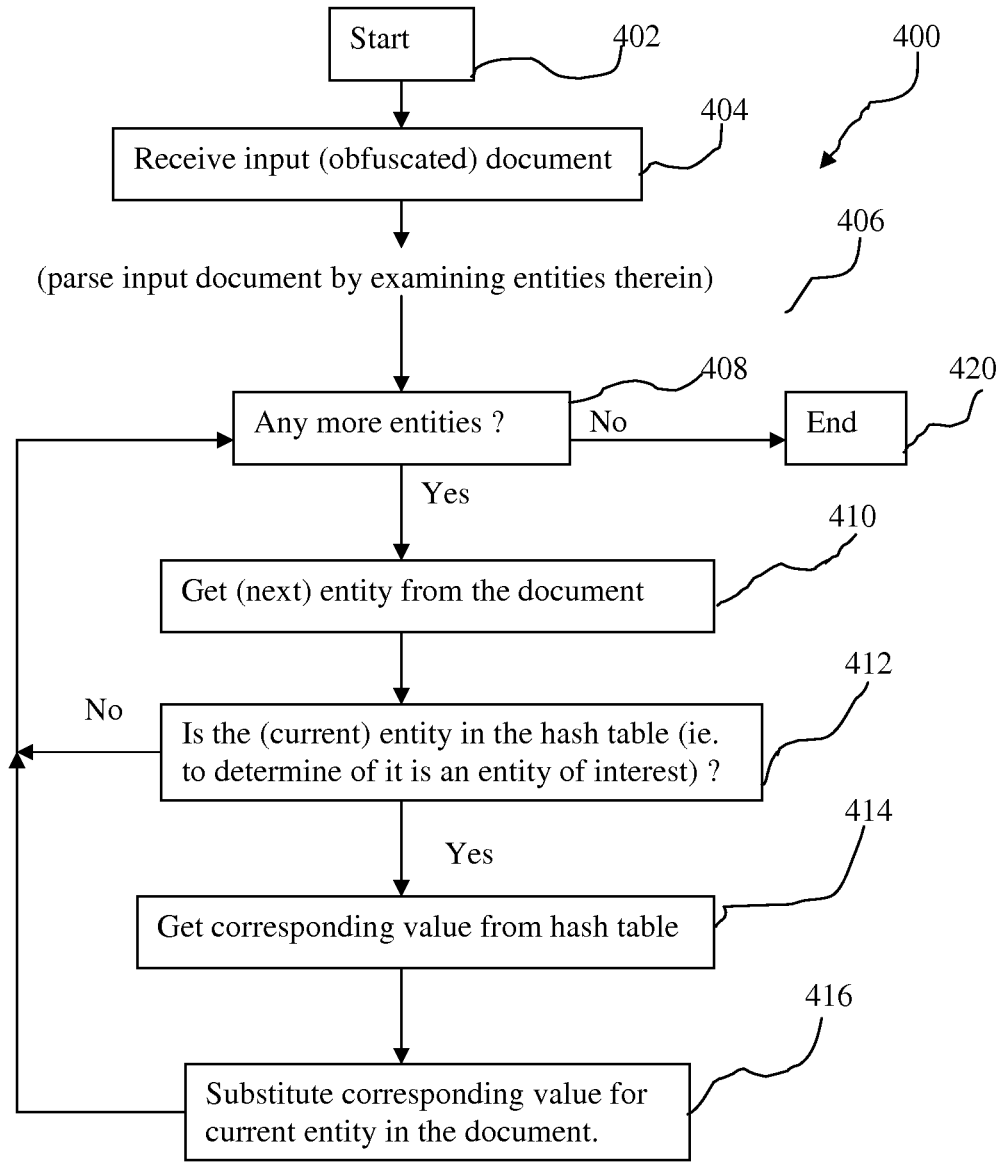
FIG. 4 is a flowchart of a method of reverse data obfuscation.

The method of data obfuscation may be implemented using a computer system 200, such as that shown in FIG. 2 wherein the processes of FIGS. 1, 3 and 4 may be implemented as software, such as one or more application programs executable within the computer system 200. In particular, the steps of the method are implemented by instructions in the software that are carried out within the computer system 200. The instructions may be formed as one or more code modules, each for performing one or more particular tasks. The software may also be divided into two separate parts, in which a first part and the corresponding code modules performs the obfuscation methods and a second part and the corresponding code modules manage a user interface between the first part and the user. The software may be stored in a computer readable medium, including the storage devices described below, for example. The software is loaded into the computer system 200 from the computer readable medium, and then executed by the computer system 200. A computer readable medium having such software or computer program recorded on it is a computer program product. The use of the computer program product in the computer system 200 preferably implements an advantageous apparatus for data obfuscation.

As seen in FIG. 2, the computer system 200 is formed by a computer module 201, input devices such as a keyboard 202 and a mouse pointer device 203, and output devices including a printer 215, a display device 214 and loudspeakers 217. An external Modulator-Demodulator (Modem) transceiver device 216 may be used by the computer module 201 for communicating to and from a communications network 220 via a connection 221. The network 220 may be a wide-area network (WAN), such as the Internet or a private WAN. Where the connection 221 is a telephone line, the modem 216 may be a traditional "dial-up" modem. Alternatively, where the connection 221 is a high capacity (eg: cable) connection, the modem 216 may be a broadband modem. A wireless modem may also be used for wireless connection to the network 220.

The computer module 201 typically includes at least one processor unit 205, and a memory unit 206 for example formed from semiconductor random access memory (RAM) and read only memory (ROM). The module 201 also includes a number of input/output (I/O) interfaces including an audio-video interface 207 that couples to the video display 214 and loudspeakers 217, an I/O interface 213 for the keyboard 202 and mouse 203 and optionally a joystick (not illustrated), and an interface 208 for the external modem 216 and printer 215. In some implementations, the modem 216 may be incorporated within the computer module 201, for example within the interface 208. The computer module 201 also has a local network interface 211, which, via a connection 223, permits coupling of the computer system 200 to a local computer network 222, known as a Local Area Network (LAN). As also illustrated, the local network 222 may also couple to the wide network 220 via a connection 224, which would typically include a so-called "firewall" device or similar functionality. The interface 211 may be formed by an Ethernet circuit card, a wireless Bluetooth™ or an IEEE 802.21 wireless arrangement.

The interfaces 208 and 213 may afford both serial and parallel connectivity, the former typically being implemented according to the Universal Serial Bus (USB) standards and having corresponding USB connectors (not illustrated). Storage devices 209 are provided and typically include a hard disk drive (HDD) 210. Other devices such as a floppy disk drive and a magnetic tape drive (not illustrated) may also be used. An optical disk drive 212 is typically provided to act as a non-volatile source of data. Portable memory devices, such optical disks (eg: CD-ROM, DVD), USB-RAM, and floppy disks for example may then be used as appropriate sources of data to the system 200.

The components 205, to 213 of the computer module 201 typically communicate via an interconnected bus 204 and in a manner which results in a conventional mode of operation of the computer system 200 known to those in the relevant art. Examples of computers on which the described arrangements can be practised include IBM-PC's and compatibles, Sun Sparcstations, Apple Mac™ or a like computer systems evolved therefrom.

Typically, the application programs discussed above are resident on the hard disk drive 210 and read and controlled in execution by the processor 205. Intermediate storage of such programs and any data fetched from the networks 220 and 222 may be accomplished using the semiconductor memory 206, possibly in concert with the hard disk drive 210. In some instances, the application programs may be supplied to the user encoded on one or more CD-ROM and read via the corresponding drive 212, or alternatively may be read by the user from the networks 220 or 222. Still further, the software can also be loaded into the computer system 200 from other computer readable media. Computer readable media refers to any storage medium that participates in providing instructions and/or data to the computer system 200 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 201. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 214. Through manipulation of the keyboard 202 and the mouse 203, a user of the computer system 200 and the application may manipulate the interface to provide controlling commands and/or input to the applications associated with the GUI(s).

Parts of the method of data obfuscation may alternatively be implemented in dedicated hardware such as one or more integrated circuits performing the functions or sub functions. One such part is the hashing process where a dedicated processor may be used. For instance, the hash functions could be hard coded; alternately the hash map values itself could be hard coded for specific domains. This would speed up the performance of the obfuscation process, where large quantities of text documents are involved.

The flow of tasks is described at a high-level, in FIG. 3 for an obfuscation method 300. The user initially at step 302 specifies the values for the various configuration parameters for obfuscation 304, such as the level of obfuscation required, the entities to be anonymized and the mappings for the different data types.

The input data, generally formed of a text document is fed at step 306 into the annotator 112 that tags the text for the various entities at step 308. This annotated text is then passed to the obfuscator module 114. The obfuscator module 114 then looks at the entities of interest, as specified by the user. This may be likened to parsing the tagged document at step 310. Each of the tagged instances is identified at step 312. If it is of interest, determined at step 314, the entity is replaced by a suitable value, looked up from the data source 116 at step 316. A suitable hash function 318 is used for the replacement, which occurs in step 320. As stated earlier, the hash function could be a simple look-up table for the values to be replaced or it could define a function defined in terms of the input values that needs to be computed for every input value that needs to be obfuscated. After replacement of the sensitive information, step 322 checks for more tags. If none, parsing is complete and the obfuscated text is presented to the user at step 324. The method 300 then ends at step 326.

Desirably, when the mapping of the tagged text data is performed using the hash function to obtain corresponding obfuscated data, the mapping retains a record of the text data and the corresponding tag. Since the tag relates to a particular position in the document, as a consequence of the sequential parsing of the document during the obfuscation process, the recorded tag and text data can then be used to reconstruct the original document from the obfuscated document, as will be described later. In this fashion the same obfuscating data may be used for multiple different tagged text data. This can avoid the need for a one-to-one hash mapping. However, if this is likely to reduce the readability of the obfuscated document, then this should be avoided. Alternatively, a simple one-to-one hash mapping may be used. The mapping table may be static or dynamically generated using randomly generated obfuscating words for each tagged entity during the parsing of the source document. Again, dynamically generated hash maps may be used as long as the information needed for reverse-mapping the obfuscated document is available, and as long as it is ascertainable that readability is preserved.

The readability of the transformed document may be increased by a number of approaches.

For example, the data sets used for replacement may be more grained—for instance, list of person names may be refined and maintained as list of North American names, list of male North American names and so on. Depending on the level of entity identification provided by the annotator 112, the more refined data sets may be chosen for replacement, thus improving the level of readability, by retaining the cultural context of the original document. Other examples are replacing names of cities by geographically proximate cities rather than cities at random, replacing email identifiers by identifiers in related domains and so on.

Another approach is that an association between dates may be maintained in the transformed document, by ensuring that the chronological relationship of dates in the transformed document matches that in the original document, to the extent possible.

The above approach to obfuscation performs text anonymization in the context of unstructured information, where:
(i) the readability of the original document is preserved desirably through replacing confidential text with ubiquitous text;
(ii) transformation is done in such a manner that it is possible to reconstruct the original document, by reverse parsing the obfuscated document to replace the obfuscating text with the original; and
(iii) the level of desensitization is a configurable parameter that may be set by the user, and for each document instance.

Reversal involves the reconstruction of the initial source document from the obfuscated document. This requires that (a) we know the entities in the source document that were anonymised and (b) we also know how they were anonymised. Since we know (a) and (b), reconstructing the initial document from the anonymised document can be done in a straightforward manner, by using suitable look-up tables. For instance, to continue with our initial example of the hash map, where all entities 'A' are replaced by the value 'astor', in the reconstruction stage, for all occurrences of 'astor' in the obfuscated document, we
(a) need to check if this is a replaced instance, and if yes
(b) replace it with the value 'A'.

FIG. 4 shows a method 400 of reverse data obfuscation by which correct data can be revealed from an obfuscated document thereby reconstructing the original document. The method 400 is desirably implemented as an application program stored and executable within the computer module 201 in much the same manner as the method 300 described above. The method 400 has an entry point 402 after which step 404 receives an input obfuscated document, for example one that has been obfuscated according to the method 300. Importantly, the method 400 requires prior knowledge of the manner in which the obfuscated document was formed. Therefore the method 400 is seen as a complement to the method 300. The obfuscated document is then parsed (generally indicated at 406) by the remainder of the method 400, the parsing revealing the obfuscated information. The parsing sequentially examines the entities within the document, the entities comprising alphanumeric strings (words/numbers). Step 408 tests whether there are any more entities to be processed, implementing the sequential parsing. Where there are entities, step 410 gets the next (unprocessed) entity from the document.

Step 412 then tests the current entity to determine if it is contained in the hash table by which obfuscation was performed. If not, the entity is not an obfuscated entity and the method 400 returns to step 408 to process the next entity. If the entity is in the hash table, step 414 follows to extract from the hash table the value corresponding to the obfuscating entity that is being processed. According to the above example, 'astor' would be mapped in the hash table to the value 'A'.

Step 416 then substitutes the corresponding value from the hash table into the document. The method 400 then returns to step 408. When all entities have been processed according to step 408, the method 400 ends at step 420. The document is at this stage un-obfuscated with the confidential information revealed.

The foregoing describes only a number of embodiments of the present invention and modifications made thereto without departing from the spiritual scope of the present disclosure.

We claim:

1. A computer-implemented method of obfuscating text data in a document, said method comprising:

establishing, using a computing device, configuration parameters to be used in obfuscating said text data in said document, said configuration parameters comprising first configuration parameters identifying selected text data in said document to be obfuscated and second configuration parameters defining one of many different selectable levels of obfuscation for said document;

identifying, by said computing device, text data in said document based on said first configuration parameters to produce identified text data;

annotating, by said computing device, each said identified text data in said document with a corresponding tag to produce annotated text data;

transforming, by said computing device, said annotated text data using obfuscating data associated with at least one of said second configuration parameters to produce transformed data according to said levels of obfuscation defined for said document;

substituting, by said computing device, said transformed data for respective annotated text data into said document; and storing, by said computing device, a record for each of said annotated text data and said corresponding tag, said transformed data displaying obfuscated text data such that readability of said document is maintained.

2. The method according to claim 1, said first configuration parameters comprising at least predetermined text entity types for obfuscation.

3. The method according to claim 1, said corresponding tag comprising information relating to a particular position of each of said annotated text data in said document.

4. The method according to claim 3, said respective tag comprising information of a configuration parameter by which said annotated text data was identified.

5. The method according to claim 4, said transforming said identified text data further comprising using said tag, by said computing device, to access a data source from which corresponding obfuscating data is selected for substitution of said annotated text data in said document based on said second configuration parameters.

6. The method according to claim 5, selection of said corresponding obfuscating data from said data source being performed by a hash function.

7. The method according to claim 6, said hash function comprising a mapping from text data associated with said corresponding tag and obfuscating data.

8. The method according to claim 5, each said second configuration parameter comprising a corresponding said data source.

9. A method of restoring an obfuscated document to an original form, said method comprising:

sequentially parsing said obfuscated document to examine text entities in said document;

determining whether a current text entity in said document is found in a hash table, said hash table being populated during creation of said obfuscated document and comprising records of original text data in said document for each of said text entities used in formation of said obfuscated document and annotation tags that identify a particular position of said text entities in said obfuscated document corresponding to said original text data;

selecting a next text entity and repeating said determining when said current text entity is not found in said hash table;

obtaining a replacement text value from said hash table, said replacement text value corresponding to said original text data for said current text entity;

substituting said replacement text value into said document in place of said current text entity according to said annotation tags; and repeating said sequentially parsing, said determining, said selecting, said obtaining and said substituting until all of said document has been parsed.

10. A non-transitory storage medium having a computer program recorded thereon, the program being executable by a computer to perform a method of obfuscating text data in a document, said method comprising:

identifying configuration parameters to be used in obfuscating said text data in said document, said configuration parameters comprising first configuration parameters identifying selected text data in said document to be obfuscated and second configuration parameters defining one of many different selectable levels of obfuscation for said document;

identifying text data in said document based on said first configuration parameters to produce identified text data;

annotating each said identified text data in said document with a corresponding tag to produce annotated text data;

transforming said annotated text data using obfuscating data associated with at least one of said second configuration parameters to produce transformed data according to said levels of obfuscation defined for said document;

substituting said transformed data for respective annotated text data into said document; and storing a record for each of said annotated text data and said corresponding tag, said transformed data displaying obfuscated text data such that readability of said document is maintained.

11. Computer apparatus for obfuscating text data in a document, said apparatus comprising:

means for establishing configuration parameters to be used in obfuscating said text data in said document, said configuration parameters comprising first configuration parameters identifying selected text data in said document to be obfuscated and second configuration parameters defining one of many different selectable levels of obfuscation for said document;

means for identifying text data in said document based on said first configuration parameters to produce identified text data;

means for annotating each said identified text data in said document with a corresponding tag to produce annotated text data;

means for transforming said annotated text data using obfuscating data associated with at least one of said second configuration parameters to produce transformed data according to said levels of obfuscation defined for said document;

means for substituting said transformed data for respective annotated text data in said document; and means for storing a record for each of said annotated text data and said corresponding tag, said transformed data displaying obfuscated text data such that readability of said document is maintained.

* * * * *